(12) United States Patent
Asukai (10) Patent No.: US 9,369,072 B2
(45) Date of Patent: Jun. 14, 2016

(54) BRUSHLESS MOTOR DRIVING CIRCUIT AND BRUSHLESS MOTOR DRIVING SYSTEM

(71) Applicant: Kabushiki Kaisha Toshiba, Minato-ku, Tokyo (JP)

(72) Inventor: Tadashi Asukai, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/478,765

(22) Filed: Sep. 5, 2014

(65) Prior Publication Data

US 2015/0236629 A1 Aug. 20, 2015

(30) Foreign Application Priority Data

Feb. 18, 2014 (JP) .................. 2014-028409

(51) Int. Cl.
*H02P 6/18* (2006.01)
(52) U.S. Cl.
CPC ............. *H02P 6/187* (2013.01); *H02P 6/182* (2013.01)
(58) Field of Classification Search
CPC ...................................... H02P 6/188
USPC ............... 318/400.06, 400.04, 400.01, 700
See application file for complete search history.

(56) References Cited

U.S. PATENT DOCUMENTS

| 6,580,236 B2 * | 6/2003 | Mitsuda | H02P 6/10 318/400.07 |
| 7,888,897 B2 * | 2/2011 | Murai | H02P 6/182 318/368 |
| 8,384,336 B2 * | 2/2013 | Gunji | H02M 1/32 318/400.26 |

FOREIGN PATENT DOCUMENTS

| JP | 2004-229385 A | 8/2004 |
| JP | 2005-137106 A | 5/2005 |
| JP | 2007-282386 A | 10/2007 |

* cited by examiner

*Primary Examiner* — David S Luo
(74) *Attorney, Agent, or Firm* — White & Case LLP (57) ABSTRACT

A controlling circuit of the brushless motor driving circuit turns on a switch circuit to provide an electrical conduction between a fixed potential and a neutral point or an electrical conduction between the fixed potential and a first to third output nodes, in a case where the first to third output node bring into a floating state when a three-phase brushless motor is rotating.

20 Claims, 4 Drawing Sheets

BRUSHLESS MOTOR DRIVING CIRCUIT AND BRUSHLESS MOTOR DRIVING SYSTEM

CROSS-REFERENCE TO RELATED APPLICATION

This application is based upon and claims the benefit of priority from the prior Japanese Patent Application No.2014-028409, filed on Feb. 18, 2014, the entire contents of which are incorporated herein by reference.

BACKGROUND

1. Field

Embodiments described herein relate generally to a brushless motor driving circuit and a brushless motor driving system.

2. Background Art

A conventional brushless motor driving circuit detects the position (phase) of the brushless motor from the induced voltage of the brushless motor by means of a comparator.

The brushless motor driving circuit may turn off the output of the power device, which drives the brushless motor, to make the brushless motor idle. In such a case, the reference voltage of the comparator becomes unstable, and the induced voltage of the motor decreases when the motor rotates at a low speed.

As the induced voltage of the brushless motor decreases out of the input range of the comparator, it becomes unable to detect the position of the motor.

If this occurs, the brushless motor driving circuit can fail to restart the brushless motor, or a loss of synchronization or an unusual noise can occur when the brushless motor driving circuit restarts the brushless motor.

DETAILED DESCRIPTION

A brushless motor driving circuit according to an embodiment controls a three-phase brushless motor that includes a permanent magnet rotor and coils of three phases that are connected to a neutral point and receive sinusoidal signals of three phases, respectively, at a first end thereof and generate a magnetic field to drive the rotor. The brushless motor driving circuit includes a power device that includes a first output node connected to a second end of a first coil of the coils of the three phases, a second output node connected to a second end of a second coil of the coils of the three phases, and a third output node connected to a second end of a third coil of the coils of the three phases. The power device supplies a power supply voltage in the form of the sinusoidal signals of three phases from the first, second and third output nodes to the three-phase brushless motor in response to a driving signal that prescribe an energization timing. The brushless motor driving circuit includes a first comparator that is connected to the first output node at a first input thereof and to the neutral point at a second input thereof, and outputs a first detection signal that is based on a magnitude relationship between a first voltage at the first output node and a neutral voltage at the neutral point. The brushless motor driving circuit includes a second comparator that is connected to the second output node at a first input thereof and to the neutral point at a second input thereof, and outputs a second detection signal that is based on a magnitude relationship between a second voltage at the second output node and the neutral voltage at the neutral point. The brushless motor driving circuit includes a third comparator that is connected to the third output node at a first input thereof and to the neutral point at a second input thereof, and outputs a third detection signal that is based on a magnitude relationship between a third voltage at the third output node and the neutral voltage at the neutral point. The brushless motor driving circuit includes a switch circuit connected between a fixed potential and the neutral point or connected between the fixed potential and the first to third output nodes. The brushless motor driving circuit includes a controlling circuit that estimates the phase of the three-phase brushless motor based on the first to third detection signals, and outputs the driving signals to the power device based on the estimated phase, and controls the switch circuit.

The controlling circuit turns on the switch circuit to provide an electrical conduction between the fixed potential and the neutral point or an electrical conduction between the fixed potential and the first to third output nodes, in a case where the power device is turned off to bring the first to third output node into a floating state when the three-phase brushless motor is rotating.

In the following, embodiments will be described with reference to the drawings.

(First Embodiment)

Figure 1:
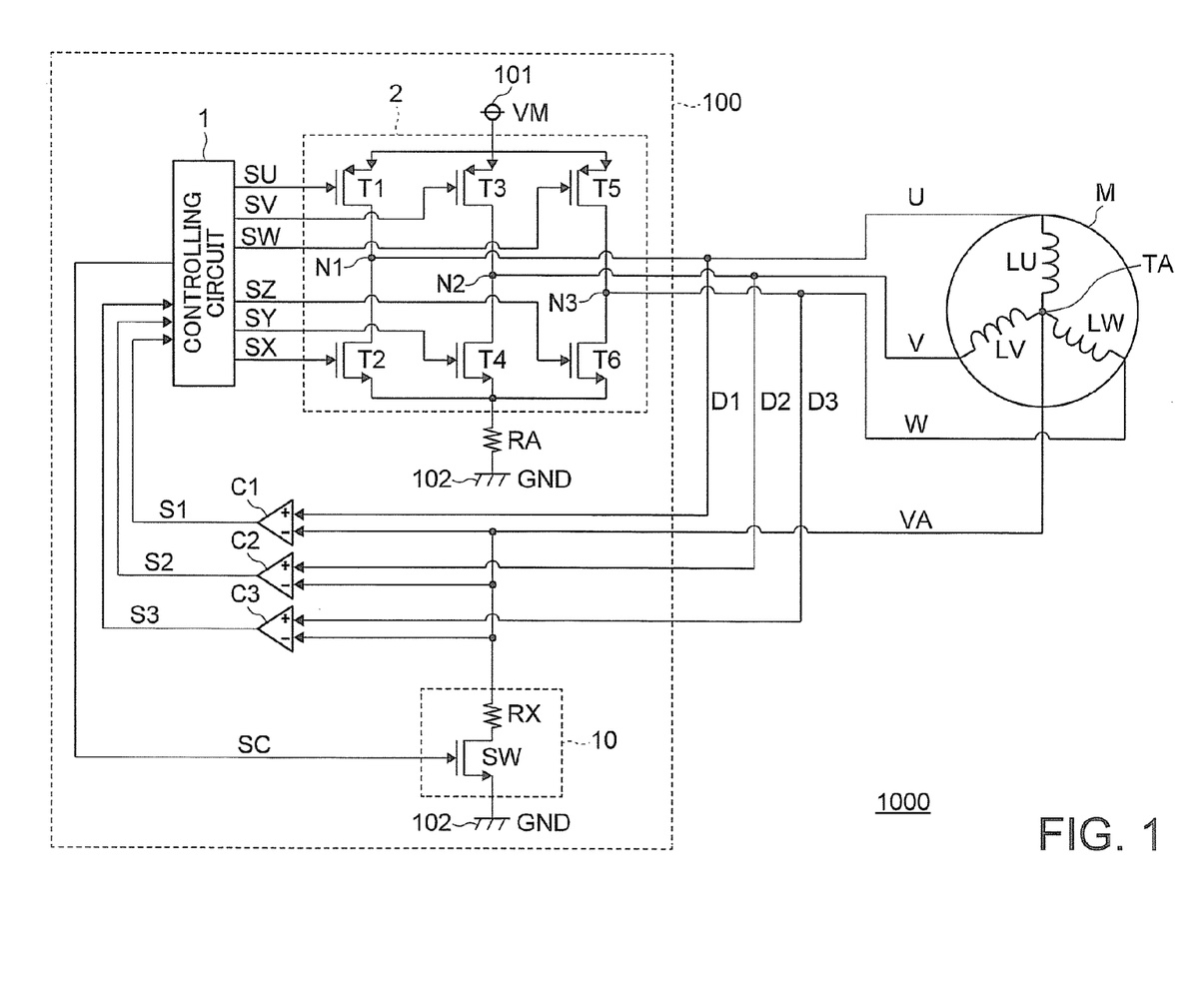
FIG. 1 is a diagram showing an example of a configuration of a brushless motor driving system 1000 according to a first embodiment.

FIG. 1 is a diagram showing an example of a configuration of a brushless motor driving system 1000 according to a first embodiment.

As shown in FIG. 1, the brushless motor driving system 1000 includes a three-phase brushless motor "M" and a brushless motor driving circuit 100.

The brushless motor "M" includes a permanent magnet rotor (not shown) and coils "LU", "LV" and "LW" of three phases that are connected to a neutral point "TA" and receive sinusoidal signals "U", "V" and "W" of three phases, respectively, at one end thereof and generate a magnetic field to drive the rotor.

The three-phase brushless motor "M" is driven by currents flowing through the three-phase coils "LU", "LV" and "LW" in response to the sinusoidal signals "U", "V" and "W" of three phases.

The brushless motor driving circuit 100 controls the driving of the three-phase brushless motor "M" with the sinusoidal signals "U", "V" and "W" of three phases. For example, the speed of the three-phase brushless motor "M" is controlled by adjusting the duty cycle, the phase advance and the phase lag of driving signals "SU", "SX", "SV", "SY", "SW" and "SZ".

As shown in FIG. 1, the brushless motor driving circuit 100 includes a controlling circuit 1, a power device 2, a switch circuit 10, a first comparator "C1", a second comparator "C2" and a third comparator "C3", for example.

As shown in FIG. 1, the power device 2 includes a first output node "N1", a second output node "N2" and a third output node "N3", for example.

The first output node "N1" is connected to another end of the first coil "LU" of the coils of the three phases.

The second output node "N2" is connected to another end of the second coil "LV" of the coils of the three phases.

The third output node "N3" is connected to another end of the third coil "LW" of the coils of the three phases.

The power device 2 supplies a power supply voltage "VM" in the form of the sinusoidal signals "U", "V" and "W" of three phases from the first, second and third output nodes "Ni", "N2" and "N3" to the three-phase brushless motor "M" in response to the driving signal "SU", "SX", "SV", "SY", "SW" and "SZ" that prescribe an energization timing As shown in FIG. 1, the power device 2 further includes a first MOS transistor "Ti", a second MOS transistor "T2", a third MOS transistor "T3", a fourth MOS transistor "T4", a fifth MOS transistor "T5" and a sixth MOS transistor "T6", for example.

The first MOS transistor "T1" is connected to a first potential line 101 at one end thereof and to the first output node "N1" at another end thereof. As shown in FIG. 1, the power supply voltage "VM" is supplied to the first potential line 101, for example.

The second MOS transistor "T2" is connected to the first output node "N1" at one end thereof and to a second potential line 102, which is at a lower potential than the first potential line 101, via a resistor "RA" at another end thereof. As shown in FIG. 1, the second potential line 102 is connected to a ground, for example.

That is, the first MOS transistor "Ti", which receives the driving signal "SU" at a gate thereof, and the second MOS transistor "T2", which receives the driving signal "SX" at a gate thereof, are connected in series with each other between the first potential line 101 and the second potential line 102. A terminal between the first MOS transistor "T1" and the second MOS transistor "T2" is connected to the U-phase coil of the three-phase brushless motor "M". The sinusoidal signal "U" is supplied from this terminal to the U-phase coil.

The third MOS transistor "T3" is connected to the first potential line 101 at one end thereof and to the second output node "N2" at another end thereof.

The fourth MOS transistor "T4" is connected to the second output node "N2" at one end thereof and to the second potential line 102 via the resistor "RA" at another end thereof.

That is, the third MOS transistor "T3", which receives the driving signal "SV" at a gate thereof, and the fourth MOS transistor "T4", which receives the driving signal "SY" at a gate thereof, are connected in series with each other between the first potential line 101 and the second potential line 102. A terminal between the third MOS transistor "T3" and the fourth
MOS transistor "T4" is connected to the V-phase coil of the three-phase brushless motor "M". The sinusoidal signal "V" is supplied from this terminal to the V-phase coil.

The fifth MOS transistor "T5" is connected to the first potential line 101 at one end thereof and to the third output node "N3" at another end thereof.

The sixth MOS transistor "T6" is connected to the third output node "N3" at one end thereof and to the second potential line 102 via the resistor "RA" at another end thereof.

That is, the fifth MOS transistor "T5", which receives the driving signal "SW" at a gate thereof, and the sixth MOS transistor "T6", which receives the driving signal "SZ" at a gate thereof, are connected in series with each other between the first potential line 101 and the second potential line 102. A terminal between the fifth MOS transistor "T5" and the sixth MOS transistor "T6" is connected to the W-phase coil of the three-phase brushless motor "M". The sinusoidal signal "W" is supplied from this terminal to the W-phase coil.

The power device 2 configured as described above controls the on/off states of the first to sixth MOS transistors "T1" to "T6" in accordance with the driving signals "SU", "SX", "SV", "SY", "SW" and "SZ", thereby outputting the sinusoidal signals of three phases from the first to third output nodes "N1" to "N3".

The first comparator "C1" is connected to the first output node "N1" at a first input (a non-inverting input terminal) thereof and to the neutral point "TA" at a second input (an inverting input terminal) thereof.

The first comparator "C1" outputs a first detection signal "S1" that is based on the magnitude relationship between a first voltage "D1" at the first output node "N1" and a neutral voltage "VA" at the neutral point "TA" (that is, the phase of the induced voltage of the first coil "LU").

The second comparator "C2" is connected to the second output node "N2" at a first input (a non-inverting input terminal) thereof and to the neutral point "TA" at a second input (an inverting input terminal) thereof.

The second comparator "C2" outputs a second detection signal "S2" that is based on the magnitude relationship between a second voltage "D2" at the second output node "N2" and the neutral voltage "VA" at the neutral point "TA" (that is, the phase of the induced voltage of the second coil "LV").

The third comparator "C3" is connected to the third output node "N3" at a first input (a non-inverting input terminal) thereof and to the neutral point "TA" at a second input (an inverting input terminal) thereof.

The third comparator "C3" outputs a third detection signal "S3" that is based on the magnitude relationship between a third voltage "D3" at the third output node "N3" and the neutral voltage "VA" at the neutral point "TA" (that is, the phase of the induced voltage of the first coil "LW").

As described above, in the example shown in FIG. 1, the first inputs of the first to third comparators "C1" to "C3" are non-inverting input terminals, and the second inputs of the first to third comparators "C1" to "C3" are inverting input terminals. Alternatively, however, the first inputs of the first to third comparators "C1" to "C3" may be inverting input terminals, and the second inputs of the first to third comparators "C1" to "C3" may be non-inverting input terminals.

The switch circuit 10 is connected between a fixed potential and the neutral point "TA". The fixed potential is set within an effective input range of the first to third comparators "C1" to "C3", for example. More preferably, the fixed potential is set at the center of the effective input range of the first to third comparators "C1" to "C3". As shown in FIG. 1, the fixed potential is a ground potential "GND" (the potential of the second potential line 102), for example.

As shown in FIG. 1, the switch circuit 10 includes a switch element "SW" and a resistor "RX", for example.

The switch element "SW" is connected between the fixed potential (the second potential line 102) and the neutral point "TA". As shown in FIG. 1, the switch element "SW" is a MOS transistor that receives a signal "SC" from the controlling circuit 1 at a gate thereof, for example.

The resistor "RX" is connected in series with the switch element "SW" between the fixed potential (the second potential line 102) and the neutral point "TA".

The controlling circuit 1 acquires information on the induced voltages of the first to third coils "LU", "LV" and "LW" from the first to third detection signals "S1" to "S3" and estimates the phase of the three-phase brushless motor "M" from the information on the induced voltages. The controlling circuit 1 performs PWM control of the power device 2 with the driving signals "SU", "SX", "SV", "SY", "SW" and "SZ".

That is, the controlling circuit 1 estimates the phase of the three-phase brushless motor "M" based on the first to third detection signals "S1" to "S3" and outputs the driving signals "SU", "SX", "SV", "SY", "SW" and "SZ" to the power device 2 based on the estimated phase.

The controlling circuit 1 further controls the switch circuit 10.

For example, in a case where the power device 2 is turned off to bring the first to third output node "N1" to "N3" into a floating state when the three-phase brushless motor "M" is rotating, the controlling circuit 1 turns on the switch circuit 10 to provide an electrical conduction between the fixed potential and the neutral point "TA". That is, in the case where the power device 2 is turned off to bring the first to third output nodes "N1" to "N3" into the floating state when the three-phase brushless motor "M" is rotating, the controlling circuit turns on the switch element "SW".

In this way, the neutral voltage "VA" at the neutral point "TA" that serves as the reference voltage for the first to third comparators "C1" to "C3" can be stabilized.

As described above, the fixed potential is set within the effective input range of the first to third comparators "C1" to "C3", for example. More preferably, the fixed potential is set at the center of the effective input range of the first to third comparators "C1" to "C3".

Therefore, in the case where the power device 2 is turned off to bring the first to third output nodes "N1" to "N3" into the floating state, the inputs of the first to third comparators "C1" to "C3" do not deviate from the input range thereof and the first to third comparators "C1" to "C3" normally operate to output the first to third detection signals "S1" to "S3", even if the rotational speed is low.

That is, in the case where the power device 2 is turned off to bring the first to third output nodes "N1" to "N3" into the floating state, the controlling circuit 1 can properly detect the phase of the three-phase brushless motor "M" and restart the motor idling at a low speed before the motor stops rotating, even if the rotational speed is low.

In a case where the power device 2 is turned on to output the sinusoidal signals from the first to third output nodes "N1" to "N3", the controlling circuit 1 turns off the switch circuit 10 to break the connection between the fixed potential and the neutral point "TA". That is, in the case where the power device 2 is turned on to output the sinusoidal signals from the first to third output nodes "N1" to "N3", the controlling circuit 1 turns off the switch element "SW".

Next, an example of operating characteristics of the brushless motor driving system 1000 configured as described above will be described.

Figure 2:
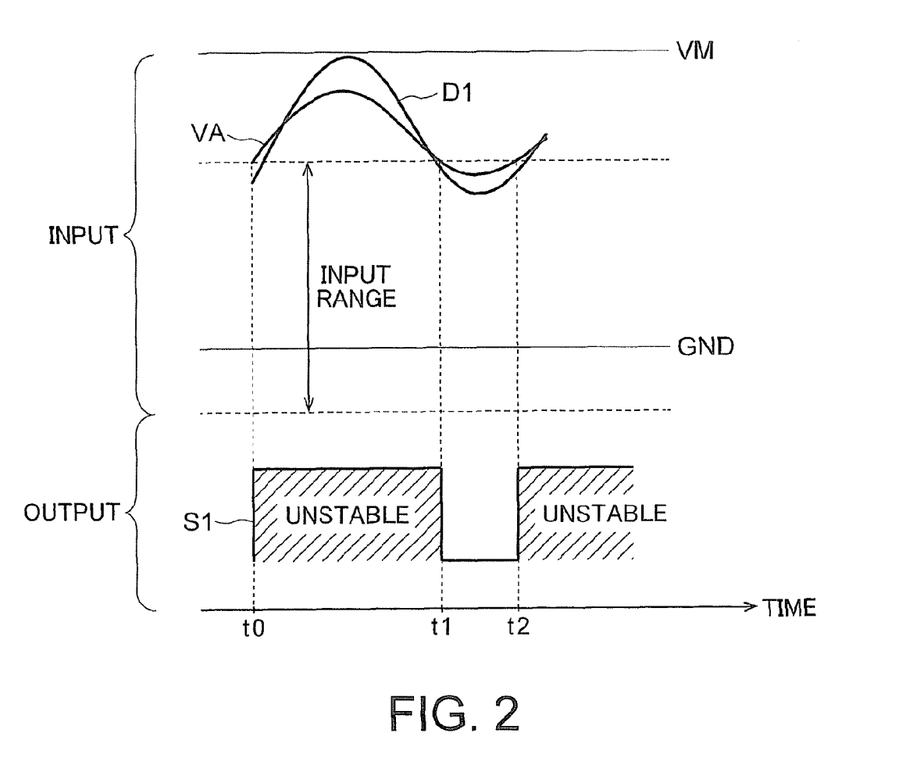
FIG. 2 is a waveform diagram showing, as a comparative example, a relationship between the input and the output of the first comparator "C1" in the case where the switch circuit 10 is in the off state in the case where the power device 2 is turned off to bring the first to third output nodes "N1" to "N3" into the floating state when the three-phase brushless motor "M" shown in FIG. 1 is rotating.
Figure 3:
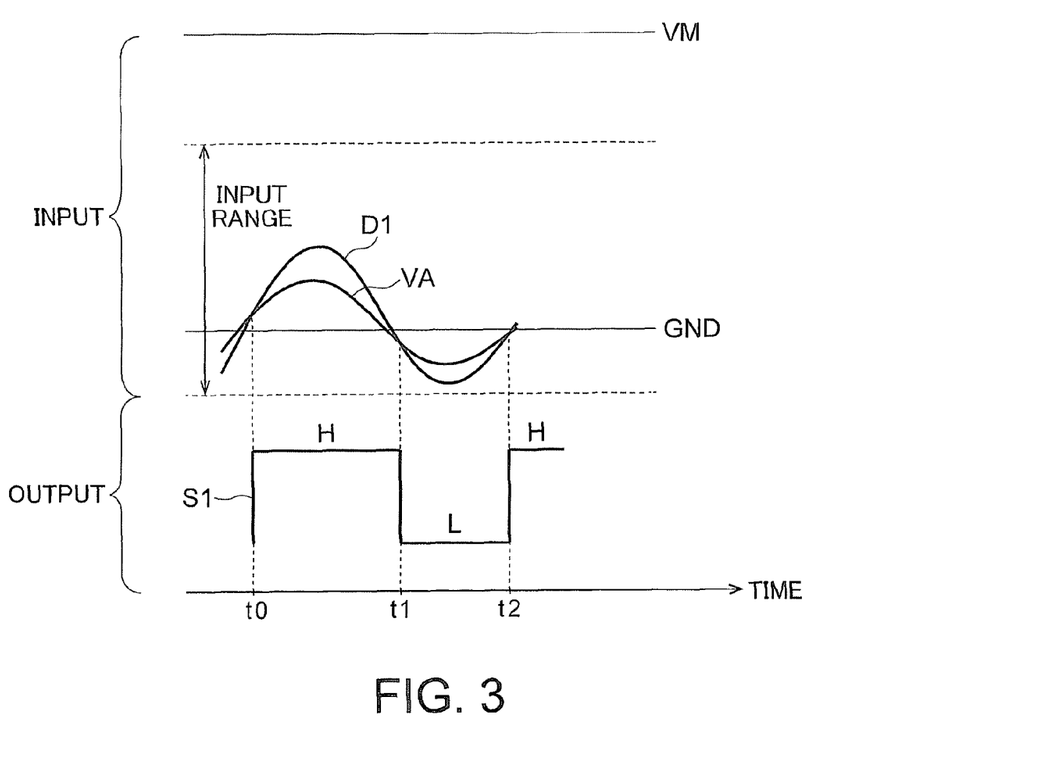
FIG. 3 is a waveform diagram showing a relationship between the input and the output of the first comparator "C1" in the case where the switch circuit 10 is turned on in the case where the power device 2 is turned off to bring the first to third output nodes "N1" to "N3" into the floating state when the three-phase brushless motor "M" shown in FIG. 1 is rotating.

FIG. 2 is a waveform diagram showing, as a comparative example, a relationship between the input and the output of the first comparator "C1" in the case where the switch circuit 10 is in the off state in the case where the power device 2 is turned off to bring the first to third output nodes "N1" to "N3" into the floating state when the three-phase brushless motor "M" shown in FIG. 1 is rotating. FIG. 3 is a waveform diagram showing a relationship between the input and the output of the first comparator "C1" in the case where the switch circuit 10 is turned on in the case where the power device 2 is turned off to bring the first to third output nodes "N1" to "N3" into the floating state when the three-phase brushless motor "M" shown in FIG. 1 is rotating.

As shown in FIG. 2, the neutral voltage "VA" at the neutral point "TA" that serves as the reference voltage for the first to third comparators "C1" to "C3" becomes unstable.

As a result, in a period from a time "t0" to a time "t1" and after a time "t2", the inputs of the first comparator "C1" (the neutral voltage "VA" and the first voltage "D1") deviate from the input range thereof, and the first detection signal "S1" becomes unstable.

On the other hand, as shown in FIG. 3, in the case where the power device 2 is turned off to bring the first to third output nodes "N1" to "N3" into the floating state when the three-phase brushless motor "M" is rotating, the controlling circuit 1 turns on the switch element "SW".

As a result, the neutral voltage "VA" at the neutral point "TA" that serves as the reference voltage for the first comparator "C1" can be stabilized.

As shown in FIG. 3, the fixed potential is set in the effective input range of the first comparator "C1".

In the period from the time "t0" to the time "t1" and after the time "t2", the neutral voltage "VA" is lower than the first voltage "D1", so that the first detection signal "S1" is set at a "High" level. On the other hand, in a period from the time "t1" to the time "t2", the neutral voltage "VA" is higher than the first voltage "D1", so that the first detection signal "S1" is set at a "Low" level.

As described above, in the case where the power device 2 is turned off to bring the first to third output nodes "N1" to "N3" into the floating state, the inputs of the first comparator "C1" do not deviate from the input range and the first comparator "C1" normally operates to output the first detection signal "Si", even if the rotational speed is low.

That is, in the case where the power device 2 is turned off to bring the first to third output nodes "N1" to "N3" into the floating state, the controlling circuit 1 can properly detect the phase of the three-phase brushless motor "M" and restart the motor idling at a low speed before the motor stops rotating, even if the rotational speed is low.

Although the first comparator "C1" has been described above, the above description holds true for the second and third comparators "C2" and "C3".

As described above, the brushless motor driving circuit according to the first embodiment can appropriately drive the brushless motor even when the brushless motor idles at a low speed.

(Second Embodiment)

Figure 4:
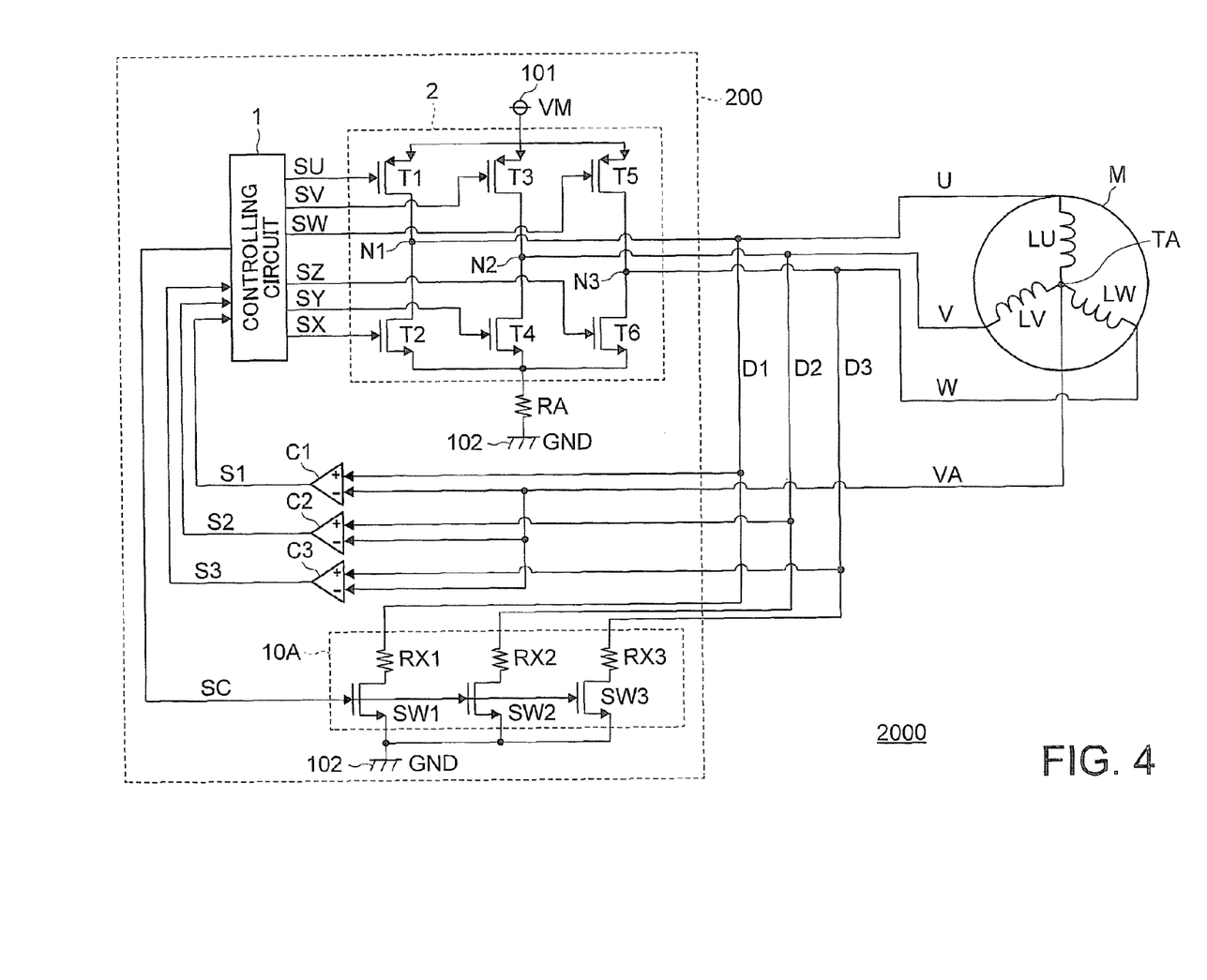
FIG. 4 is a diagram showing an example of a configuration of a brushless motor driving system 2000 according to a second embodiment.

FIG. 4 is a diagram showing an example of a configuration of a brushless motor driving system 2000 according to a second embodiment. In FIG. 4, the same reference symbols as those in FIG. 1 denote the same components as those in the first embodiment, and descriptions thereof will be omitted.

As shown in FIG. 4, the brushless motor driving system 2000 includes the three-phase brushless motor "M" and a brushless motor driving circuit 200.

The brushless motor driving circuit 200 controls the driving of the three-phase brushless motor "M" with the sinusoidal signals "U", "V" and "W" of three phases. For example, the speed of the three-phase brushless motor "M" is controlled by adjusting the duty cycle, the phase advance and the phase lag of the driving signals "SU", "SX", "SV", "SY", "SW" and "SZ".

As shown in FIG. 4, the brushless motor driving circuit 200 includes the controlling circuit 1, the power device 2, a switch circuit 10A, the first comparator "C1", the second comparator "C2" and the third comparator "C3", for example.

The switch circuit 10A is connected between the fixed potential and the first to third output nodes "N1" to "N3".

As shown in FIG. 4, the switch circuit 10A includes a first switch element "SW1", a second switch element "SW2", a third switch element "SW3", a first resistor "RX1", a second resistor "RX2" and a third resistor "RX3", for example.

The first switch element "SW1" is connected between the fixed potential and the first output node "N1" (the another end of the first coil "LU"). As shown in FIG. 4, the first switch element "SW1" is a MOS transistor, for example.

The first resistor "RX1" is connected in series with the first switch element "SW1" between the fixed potential and the first output node "N1".

The second switch element "SW2" connected between the fixed potential and the second output node "N2" (the another end of the second coil "LV"). As shown in FIG. 4, the second switch element "SW2" is a MOS transistor, for example.

The second resistor "RX2" is connected in series with the second switch element "SW2" between the fixed potential and the second output node "N2".

The third switch element "SW3" is connected between the fixed potential and the third output node "N3" (the another end of the third coil "LW"). As shown in FIG. 4, the third switch element "SW3" is a MOS transistor, for example.

The third resistor "RX3" is connected in series with the third switch element "SW3" between the fixed potential and the third output node "N3".

In the case where the power device 2 is turned off to bring the first to third output nodes "N1" to "N3" into the floating state when the three-phase brushless motor "M" is rotating, the controlling circuit 1 turns on the switch circuit 10A to provide an electrical conduction between the fixed potential and the first to third output nodes "N1" to "N3" (the another end of the first coil "LU", the another end of the second coil "LV" and the another end of the third coil "LW").

That is, in the case where the power device 2 is turned off to bring the first to third output nodes "N1" to "N3" into the floating state when the three-phase brushless motor "M" is rotating, the controlling circuit turns on the first to third switch elements "SW1" to "SW3".

In this way, the neutral voltage "VA" at the neutral point "TA" that serves as the reference voltage for the first to third comparators "C1" to "C3" can be stabilized.

On the other hand, in the case where the power device 2 is turned on to output the sinusoidal signals from the first to third output nodes "N1" to "N3", the controlling circuit 1 turns off the switch circuit 10A to break the connection between the fixed potential and the first to third output nodes "N1" to "N3".

That is, in the case where the power device 2 is turned on to output the sinusoidal signals from the first to third output nodes "N1" to "N3", the controlling circuit 1 turns off the first to third switch elements "SW1" to "SW3".

The remainder of the configuration and functionality of the brushless motor driving system 2000 is the same as that of the brushless motor driving system 1000 according to the first embodiment.

The operating characteristics of the brushless motor driving system 2000 according to this embodiment are also the same as those of the brushless motor driving system 1000 according to the first embodiment.

That is, the brushless motor driving circuit according to the second embodiment can appropriately drive the brushless motor even when the brushless motor idles at a low speed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A brushless motor driving circuit for controlling a three-phase brushless motor, the three-phase brushless motor comprising a permanent magnet rotor and coils of three phases that are connected to a neutral point and receive sinusoidal signals of three phases, respectively, at a first end thereof and generate a magnetic field to drive the rotor, the brushless motor driving circuit comprising:

a power device comprising a first output node connected to a second end of a first coil of the coils of the three phases, a second output node connected to a second end of a second coil of the coils of the three phases, and a third output node connected to a second end of a third coil of the coils of the three phases, and the power device supplying a power supply voltage in the form of the sinusoidal signals of three phases from the first, second and third output nodes to the three-phase brushless motor in response to a driving signal that prescribe an energization timing;

a first comparator connected to the first output node at a first input thereof and to the neutral point at a second input thereof, and the first comparator outputting a first detection signal that is based on a magnitude relationship between a first voltage at the first output node and a neutral voltage at the neutral point;

a second comparator connected to the second output node at a first input thereof and to the neutral point at a second input thereof, and the second comparator outputting a second detection signal that is based on a magnitude relationship between a second voltage at the second output node and the neutral voltage;

a third comparator connected to the third output node at a first input thereof and to the neutral point at a second input thereof, and the third comparator outputting a third detection signal that is based on a magnitude relationship between a third voltage at the third output node and the neutral voltage;

a switch circuit connected between a fixed potential and the neutral point or connected between the fixed potential and the first to third output nodes;

a controlling circuit estimating the phase of the three-phase brushless motor based on the first to third detection signals, and the controlling circuit outputting the driving signals to the power device based on the estimated phase, and the controlling circuit controlling the switch circuit, and wherein the controlling circuit turns on the switch circuit to provide an electrical conduction between the fixed potential and the neutral point or an electrical conduction between the fixed potential and the first to third output nodes, in a case where the first to third output node bring into a floating state when the three-phase brushless motor is rotating.

2. The brushless motor driving circuit according to claim 1, wherein the controlling circuit turns off the switch circuit to break the connection between the fixed potential and the neutral point or the connection between the fixed potential and the first to third output nodes, in a case where the first to third output nodes output the sinusoidal signals.

3. The brushless motor driving circuit according to claim 1, wherein the fixed potential is set within an effective input range of the first to third comparators.

4. The brushless motor driving circuit according to claim 3, wherein the fixed potential is set at a center of the effective input range.

5. The brushless motor driving circuit according to claim 1, wherein the controlling circuit acquires information on induced voltages of the first to third coils from the first to third detection signals, and the controlling circuit estimates the phase of the three-phase brushless motor from the information on the induced voltages.

6. The brushless motor driving circuit according to claim 1, wherein the switch circuit comprises:

a switch element connected between the fixed potential and the neutral point; and a resistor connected in series with the switch element between the fixed potential and the neutral point.

7. The brushless motor driving circuit according to claim 6, wherein the controlling circuit turns off the switch element in the case where the first to third output nodes output the sinusoidal signals.

8. The brushless motor driving circuit according to claim 1, wherein the switch circuit comprises:

a first switch element connected between the fixed potential and the first output node;

a first resistor connected in series with the first switch element between the fixed potential and the first output node;

a second switch element connected between the fixed potential and the second output node;

a second resistor connected in series with the second switch element between the fixed potential and the second output node;

a third switch element connected between the fixed potential and the third output node; and a third resistor connected in series with the third switch element between the fixed potential and the third output node; and wherein the controlling circuit turns on the first to third switch elements in the case where the first to third output nodes bring into the floating state when the three-phase brushless motor is rotating.

9. A brushless motor driving circuit for controlling a three-phase brushless motor, the three-phase brushless motor comprising a permanent magnet rotor and coils of three phases that are connected to a neutral point and receive sinusoidal signals of three phases, respectively, at a first end thereof and generate a magnetic field to drive the rotor, and the brushless motor driving circuit comprising:

a power device comprising a first output node connected to a second end of a first coil of the coils of the three phases, a second output node connected to a second end of a second coil of the coils of the three phases, and a third output node connected to a second end of a third coil of the coils of the three phases, and the power device supplying a power supply voltage in the form of the sinusoidal signals of three phases from the first, second and third output nodes to the three-phase brushless motor in response to a driving signal that prescribe an energization timing;

a first comparator connected to the first output node at a first input thereof and to the neutral point at a second input thereof;

a second comparator connected to the second output node at a first input thereof and to the neutral point at a second input thereof;

a third comparator connected to the third output node at a first input thereof and to the neutral point at a second input thereof;

a switch circuit connected between a fixed potential and the neutral point or connected between the fixed potential and the first to third output nodes; and a controlling circuit controlling a potential of the neutral point or the first to third output nodes to be the fixed potential by controlling the switch circuit in a case where the power device is turned off when the three-phase brushless motor is rotating.

10. The brushless motor driving circuit according to claim 9, wherein the fixed potential is set within an effective input range of the first to third comparators.

11. The brushless motor driving circuit according to claim 10, wherein the fixed potential is set at a center of the effective input range.

12. A brushless motor driving system comprising:

a three-phase brushless motor comprising a permanent magnet rotor and coils of three phases that are connected to a neutral point and receive sinusoidal signals of three phases, respectively, at a first end thereof and generate a magnetic field to drive the rotor; and a brushless motor driving circuit controlling the three-phase brushless motor, and wherein the brushless motor driving circuit comprising:

a power device comprising a first output node connected to a second end of a first coil of the coils of the three phases, a second output node connected to a second end of a second coil of the coils of the three phases, and a third output node connected to a second end of a third coil of the coils of the three phases, and the power device supplying a power supply voltage in the form of the sinusoidal signals of three phases from the first, second and third output nodes to the three-phase brushless motor in response to a driving signal that prescribe an energization timing;

a first comparator connected to the first output node at a first input thereof and to the neutral point at a second input thereof, and the first comparator outputting a first detection signal that is based on a magnitude relationship between a first voltage at the first output node and a neutral voltage at the neutral point;

a second comparator connected to the second output node at a first input thereof and to the neutral point at a second input thereof, and the second comparator outputting a second detection signal that is based on a magnitude relationship between a second voltage at the second output node and the neutral voltage;

a third comparator connected to the third output node at a first input thereof and to the neutral point at a second input thereof, and the third comparator outputting a third detection signal that is based on a magnitude relationship between a third voltage at the third output node and the neutral voltage;

a switch circuit connected between a fixed potential and the neutral point or connected between the fixed potential and the first to third output nodes;

a controlling circuit estimating the phase of the three-phase brushless motor based on the first to third detection signals, and the controlling circuit outputting the driving signals to the power device based on the estimated phase, and the controlling circuit controlling the switch circuit, and wherein the controlling circuit turns on the switch circuit to provide an electrical conduction between the fixed potential and the neutral point or an electrical conduction between the fixed potential and the first to third output nodes, in a case where the first to third output node bring into a floating state when the three-phase brushless motor is rotating.

13. The brushless motor driving system according to claim 12, wherein the controlling circuit turns off the switch circuit to break the connection between the fixed potential and the neutral point or the connection between the fixed potential and the first to third output nodes, in a case where the first to third output nodes output the sinusoidal signals.

14. The brushless motor driving system according to claim 13, wherein the switch circuit comprises:

a first switch element connected between the fixed potential and the first output node;

a first resistor connected in series with the first switch element between the fixed potential and the first output node;

a second switch element connected between the fixed potential and the second output node;

a second resistor connected in series with the second switch element between the fixed potential and the second output node;

a third switch element connected between the fixed potential and the third output node; and a third resistor connected in series with the third switch element between the fixed potential and the third output node; and wherein the controlling circuit turns on the first to third switch elements in the case where the first to third output nodes bring into the floating state when the three-phase brushless motor is rotating.

15. The brushless motor driving system according to claim 12, wherein the fixed potential is set within an effective input range of the first to third comparators.

16. The brushless motor driving system according to claim 15, wherein the fixed potential is set at a center of the effective input range.

17. The brushless motor driving system according to claim 12, wherein the controlling circuit acquires information on induced voltages of the first to third coils from the first to third detection signals, and the controlling circuit estimates the phase of the three-phase brushless motor from the information on the induced voltages.

18. The brushless motor driving system according to claim 12, wherein the switch circuit comprises:

a switch element connected between the fixed potential and the neutral point; and a resistor connected in series with the switch element between the fixed potential and the neutral point.

19. The brushless motor driving system according to claim 18, wherein the controlling circuit turns off the switch element in the case where the first to third output nodes output the sinusoidal signals z.

20. The brushless motor driving system according to claim 12, wherein the switch circuit comprises:

a first switch element connected between the fixed potential and the first output node;

a first resistor connected in series with the first switch element between the fixed potential and the first output node;

a second switch element connected between the fixed potential and the second output node;

a second resistor connected in series with the second switch element between the fixed potential and the second output node;

a third switch element connected between the fixed potential and the third output node; and a third resistor connected in series with the third switch element between the fixed potential and the third output node; and wherein the controlling circuit turns on the first to third switch elements in the case where the power device is turned off to bring the first to third output nodes into the floating state when the three-phase brushless motor is rotating.

* * * * *